Nov. 6, 1962 W. A. DEMING 3,062,067
PINTLE CHAIN
Filed July 22, 1959
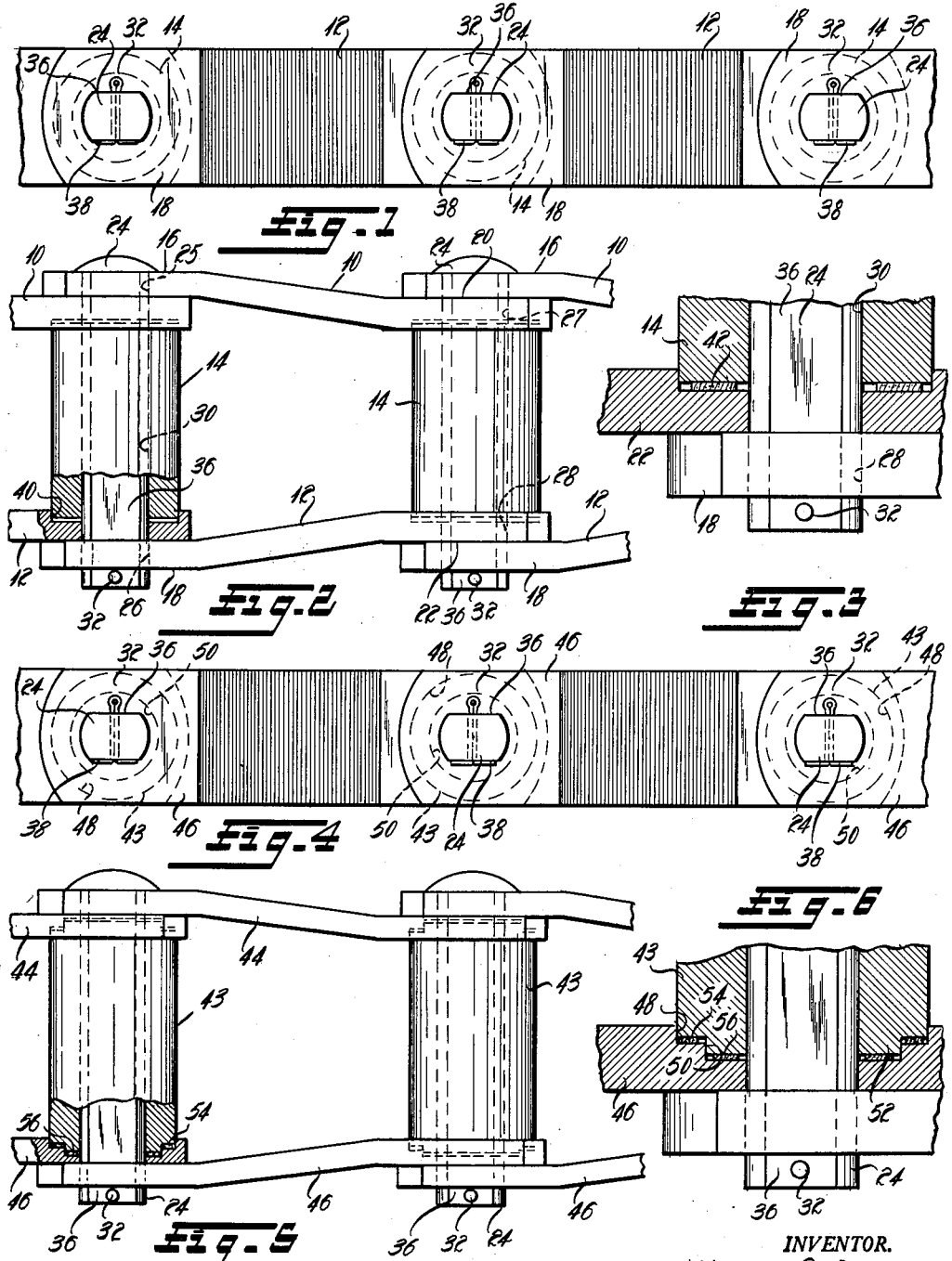
INVENTOR.
WILLIAM A. DEMING
BY
Strauch Nolan & Neale
ATTORNEYS ়
United States Patent Office 3,062,067
Patented Nov. 6, 1962

3,062,067
PINTLE CHAIN
William A. Deming, Seattle, Wash., assignor to Bellingham Chain & Forge Company, Seattle, Wash., a corporation of Washington
Filed July 22, 1959, Ser. No. 828,759
2 Claims. (Cl. 74—245)

This invention relates to conveyor or pintle chains and more particularly to the chains of the general type which are in widespread use in the forest products industry.

Chains of this type, which are used in extremely rugged service must meet several exacting requirements. For example, they must be exceptionally strong and yet as light as possible and they must be of relatively low cost.

It is a principal purpose and object of the present invention to provide improved chains satisfying these requirements to a degree not approached by prior devices and to provide improved methods for manufacturing such chains.

It is also an object of the present invention to provide improved chains which are fabricated from simple structural elements which are of low cost and are made from materials widely available in the commercial market and which have an exceptionally high strength-to-weight ratio.

It is a further object of the invention to provide improved methods for fabricating chains by pressure welding or brazing after preliminary machining of the chain components to simplify the welding or brazing process and to assure the production of chains having uniformly high strength and resistance to breakage.

It is also an important object of the invention to provide improved methods for manufacturing pintle chains which may be performed substantially entirely with conventional automatic machinery and thus eliminates the need for highly skilled labor.

Additional objects and advantages of the invention will become apparent as the description proceeds in connection with the accompanying drawings in which:

FIGURE 1 is a side elevation of a chain constructed in accordance with the present invention;

FIGURE 2 is an enlarged top plan view of a portion of the chain of FIGURE 1;

FIGURE 3 is an enlarged fragmentary section of a portion of the chain of FIGURES 1 and 2;

FIGURE 4 is a side elevation of a modified form of the chain of the present invention;

FIGURE 5 is an enlarged fragmentary top plan view of the chain of FIGURE 4; and

FIGURE 6 is an enlarged fragmentary section of a portion of the chain of FIGURES 4 and 5.

Referring now more particularly to the drawings, the chain shown in FIGURES 1–3 comprises a series of identical links each comprising side bars 10 and 12 and a cylindrical barrel 14. The side bars 10 and 12 are flared outwardly so that the space between the flattened end portions 16 and 18 of the respective bars 10 and 12 are substantially equal to the dimension between the outer surfaces of the flattened portions 20 and 22 at the opposite ends of the respective bars so that the chain may be made up of a series of identical links.

The links are connected together by pins 24 which extend through aligned openings 25 and 26 in the respective portions 16 and 18 of one link, aligned openings 27 and 28 in the portions 20 and 22 of an adjacent link, and the central opening 30 in the barrel 14. If desired, a cotter pin or other retaining pin 32 may be provided to hold the pin in place. In practice it has been found desirable to avoid rotation of the pins 24 and accordingly they are provided with upper and lower flattened surfaces 36 and 38 which abut corresponding flattened surfaces in the openings in the side bars 10 and 12. It will be noted that the flattened surfaces 36 and 38 are so positioned that the full section of the pins 24 are preserved in the direction of pull.

In fabricating the links, the side bars 10 and 12 are first stamped and punched from flat sheet stock to the desired configuration. The cylindrical recesses 40 are then formed in the end portions 20 and 22 of the side bars 10 and 12, respectively. These recesses are formed concentrically with the openings 27 and 28 and are substantially the same diameter as the outer diameter of the barrels 14 so that the ends of the latter may be received within the recesses 40 with a close sliding fit although a press fit at this point is neither necessary nor desirable. The barrels 14 are rolled from flat steel stock and are welded along the joint line to form a completely closed cylinder. The ends of the barrels are then surface ground to assure that they are perfectly flat and parallel.

All of the operations thus far described may be performed at low cost on a production basis with standard machinery. For example, the side bars and the barrel may be formed with simple stamping and rolling machinery. The ends of the barrels 14 are formed by surface grinding which can be accomplished simultaneously on a large number of barrels in a single machine. The recesses 40 are automatically end milled. In no case do any of these operations require the use of skilled labor or special techniques.

After the parts have been formed as above described and suitably cleaned, one of the barrels 14 and two side bars 10 and 12 are assembled in a spring loaded jig with the ends of the barrels extending into the recesses 40, a wire or washer 42 of suitable brazing material being first positioned at the bottom of each of the recesses 40. Because of the automatic alignment of the parts which is effected simply by putting them together, the need for expensive jigs is entirely eliminated. The parts thus assembled in a spring loaded jig, which applies a light pressure sufficient to expel the gases in the recesses 40, are placed in a furnace where they are held for about 45 minutes at a temperature of approximately 1200° F. Treatment at this temperature and for this period produces an excellent weld and a sound joint. After the units are removed from the furnace and allowed to cool, they are ready for use without further treatment and the hand finishing and cleaning techniques required in previous chain link assemblies are entirely eliminated. This is an important feature of the invention since the previous finishing operations were necessarily accomplished largely by hand.

The chain assembly of FIGURES 4, 5 and 6 differs from the assembly of FIGURES 1–3 only insofar as the joint between the ends of the barrel 43 and the side bars 44 and 46 is concerned. In this form of the invention the recesses in the side bars 44 and 46 comprise a major cylindrical recess 48 which is counterbored to form an inner concentric recess 50. The ends of the barrel 43 are formed correspondingly so that the major diameter of the barrel fits snugly within the recess 48 while a projection 52 on the barrel fits snugly within the recess 50. After the parts have been suitably shaped, they are assembled in a spring-loaded jig and wires or washers 54 and 56 of braze material are positioned in the bottoms of the respective recess 48 and 50 and the pressure welding is completed by placing the assembled units and jigs in a furnace in accordance with procedure described above.

Actual experience has shown that the construction of FIGURES 4, 5 and 6 produces an even stronger joint between the barrel and the side bars. However, the unit of FIGURES 4–6 is somewhat more costly than the unit of FIGURES 1–3 because of the two additional machining operations which are required on the barrel and side bars. However in either form of the invention the cost of the completed unit is well below the cost of units having comparable performance characteristics and each form of the invention is susceptible of fabrication on a mass production basis without the use of special tools or highly skilled and expensive labor.

The strength of both forms of the chain link assemblies is twenty to thirty percent greater than previous assemblies of the same weight. It is believed that a substantial portion of this increase is due to the provision of the recesses in the side bars which provide surfaces against which the ends of the barrel bear when the chains are loaded under tension.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A chain construction comprising a pair of side bars, each of said side bars having a first through opening at one end, said first through openings being of uniform section from end to end for the reception of a pin with a close clearance fit, the opposite ends of said side bars each having a second through opening, at least the outer portion of which surrounds the shank of a pin with a close clearance fit, the inner portions of said second through openings being enlarged to provide inwardly facing recesses having substantially flat bottom walls, a barrel received in said recesses with a close clearance fit, said barrel having substantially flat end surfaces, and weldments joining the flat surfaces on said barrel with the flat walls on said side bars.

2. A chain construction comprising a pair of side bars, each of said side bars having a first through opening at one end, said first through openings being of uniform section from end to end, a pin extending through said first openings with a close clearance fit, said pin and said openings having mating flats to lock said pin against rotation with respect to said side bars, the opposite ends of said side bars each having a second through opening, at least the outer portion of which is cylindrical and closely surrounds the shank of a pin to permit rotation of said pin therein, the inner portions of said second through openings being enlarged to provide inwardly facing recesses having substantially flat bottom walls, a barrel having its opposite ends received in said recesses with a close clearance fit, said barrel having substantially flat end surfaces, weldments joining the flat surfaces on said barrel with flat walls on said side bars, said barrel having a through opening aligned with the outer portions of said second through openings in said side bars, said through opening in said barrel receiving the shank of a pin with a close clearance fit.

References Cited in the file of this patent

UNITED STATES PATENTS

| | | |
|---|---|---|
| 2,155,626 | Weiss | Apr. 25, 1939 |
| 2,729,935 | Beck | Jan. 10, 1956 |
| 2,833,152 | Hedlund et al. | May 6, 1958 |
| 2,844,042 | Mercier | July 22, 1958 |
| 2,869,380 | Lemmon | Jan. 20, 1959 |